May 26, 1959   F. B. TAYLOR   2,888,287
PNEUMATIC LOCK SYSTEM FOR VEHICLES
Filed Dec. 9, 1955   3 Sheets-Sheet 1
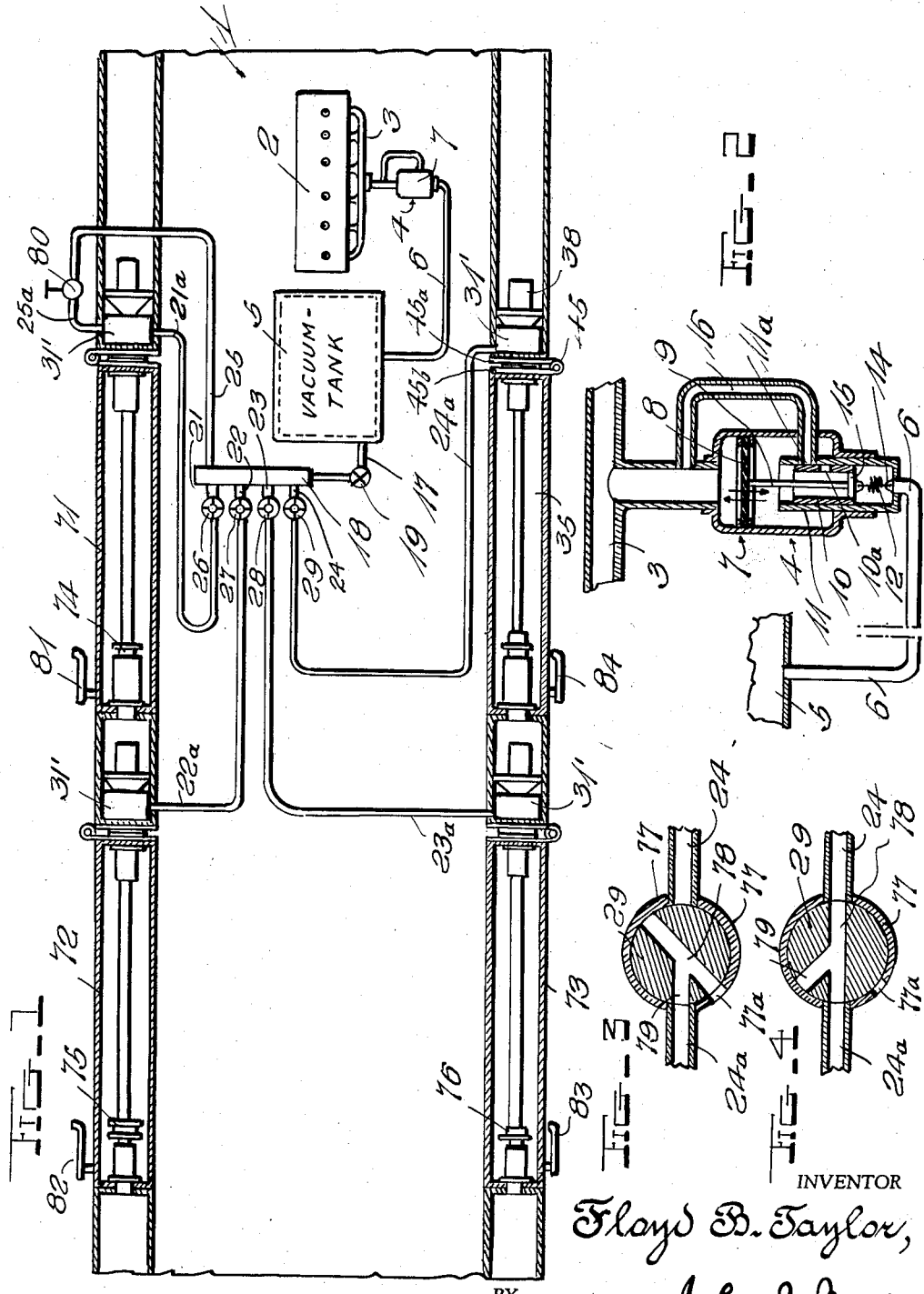
INVENTOR
Floyd B. Taylor,
BY
ATTORNEY

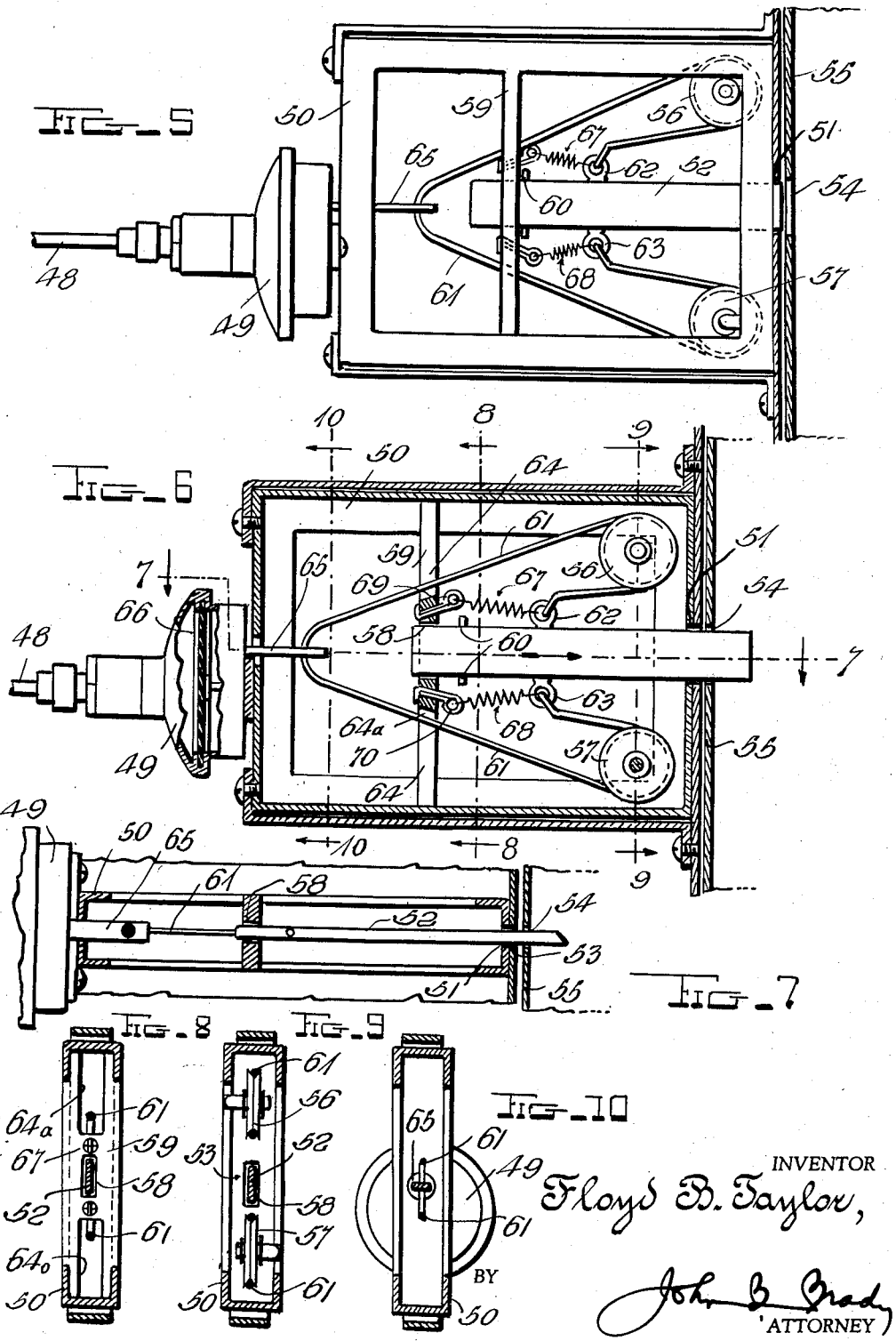

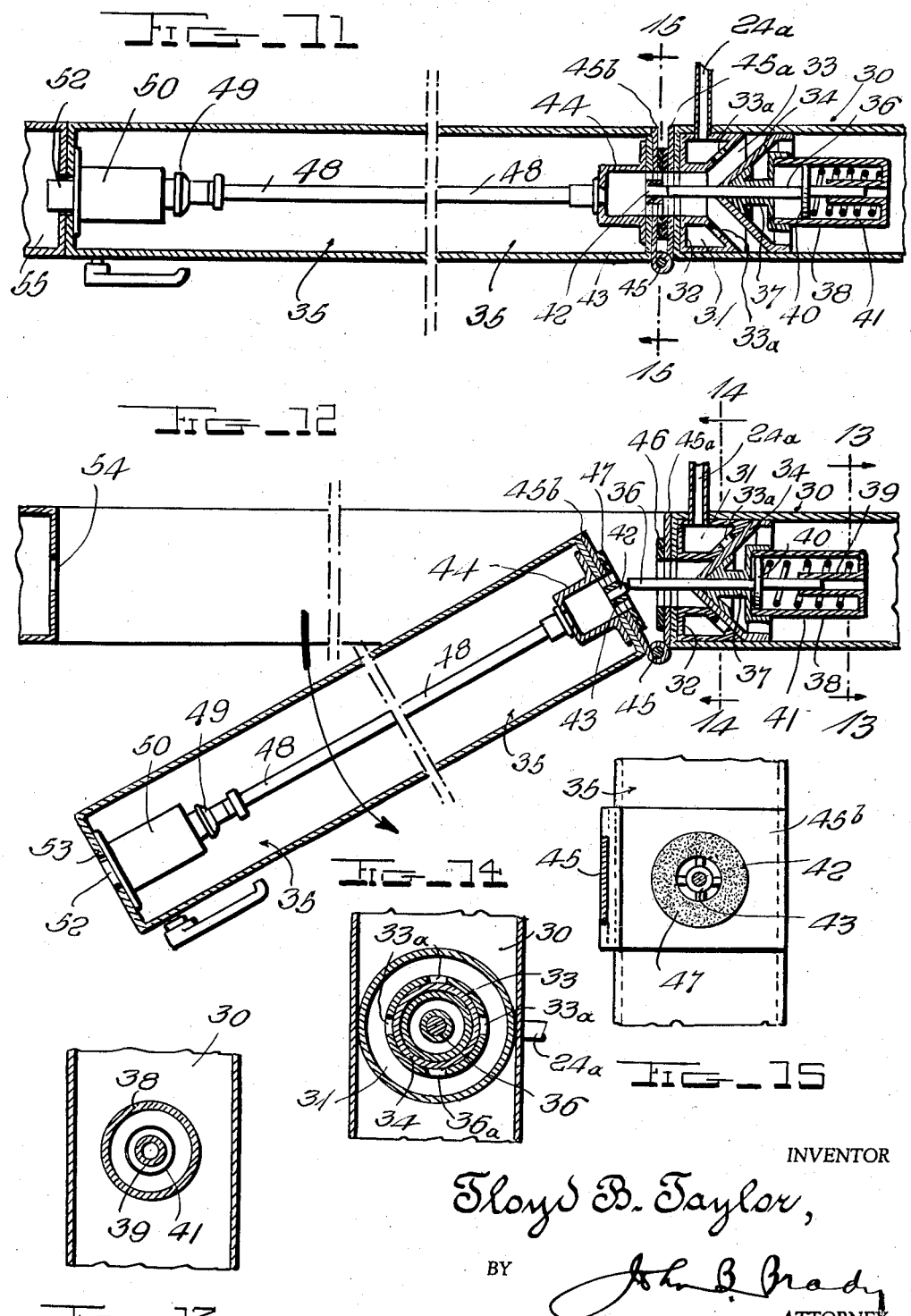

United States Patent Office 2,888,287
Patented May 26, 1959

2,888,287

PNEUMATIC LOCK SYSTEM FOR VEHICLES

Floyd B. Taylor, Columbus, Miss., assignor of nine percent to George H. Guckert, eighteen percent to Henry Beneke, eighteen percent to Everett Winters, and five percent to William J. Threadgill, all of Columbus, Miss.

Application December 9, 1955, Serial No. 552,132

11 Claims. (Cl. 292—33)

My invention relates broadly to locks and more particularly to a pneumatically operated lock system by which a multiplicity of locks may be selectively controlled individually or simultaneously.

One of the objects of my invention is to provide a pneumatic lock system particularly adapted for installation on motor vehicles for controlling the locking or unlocking of the motor vehicle doors selectively or simultaneously.

Another object of my invention is to provide a pneumatic lock system for the doors of a motor vehicle in which the pneumatic locking of the doors may be controlled independently of the operation of the engine of the vehicle, that is whether the engine is operating or not.

Still another object of my invention is to provide an arrangement of pneumatic lock system for motor vehicles in which the operation of the motor vehicle engine is utilized to establish a vacuum pressure in a vacuum tank which is selectively connectable with the pneumatic locks in the motor vehicle to insure the pneumatic operation of the locks when the motor vehicle is at rest and the engine is not operating.

Another object of my invention is to provide a construction of pneumatically operated lock which is readily installable in the hinged door of a motor vehicle for coacting with associated latching means in the door jamb.

Still another object of my invention is to provide a construction of vacuum valve cut-off which is readily installable in the door jamb of a motor vehicle for entirely cutting off the supply of vacuum pressure to the pneumatic lock mechanism installed in the door when the door is moved to open position while automatically cutting on vacuum pressure to the pneumatic lock mechanism when the door is moved to closed position.

Other and further objects of my invention reside in the balanced arrangement of vacuum locks for installation in doors as set forth more fully in the specification hereinafter following by reference to the accompanying drawings in which:

Fig. 1 is a schematic plan view illustrating the pneumatic lock system of my invention applied to a four-door sedan motor car and showing particularly the arrangement of vacuum tank connected with the suction intake manifold of the vehicle engine and the means for selectively or simultaneously pneumatically controlling the locking or unlocking of the vehicle doors;

Fig. 2 schematically illustrates one arrangement of check valve system by which vacuum is maintained in the vacuum tank under control of the suction cycles of the internal combustion engine and independently of those cycles of the engine during which suction pressure is not established;

Fig. 3 is a schematic illustration showing the position of one of the control valves for selectively controlling the application of vacuum to the pneumatic locks, the figure illustrating the condition during which the vacuum lock is being bled to atmospheric pressure and the vacuum pressure is not being supplied to the pneumatic lock so that the pneumatic lock is moved to unlocked position;

Fig. 4 is a view of one of the control valves selectively moved to a position in which vacuum pressure is applied to the pneumatic lock and the pneumatic lock is no longer being bled to atmospheric pressure as represented in Fig. 3;

Fig. 5 is an elevational view of one of the pneumatic locks of my invention arranged for mounting within the door of a motor vehicle, the view showing a condition where there is no vacuum pressure supplied to the lock and the door is open;

Fig. 6 is a vertical sectional view through the pneumatic lock of Fig. 5 and showing a condition where vacuum is applied to the pneumatic lock and the locking bolt is moved to locking position;

Fig. 7 is a longitudinal sectional view taken substantially on line 7—7 of Fig. 6;

Fig. 8 is a vertical sectional view on line 8—8 of Fig. 6;

Fig. 9 is a vertical sectional view taken on line 9—9 of Fig. 6;

Fig. 10 is a vertical sectional view taken substantially on line 10—10 of Fig. 6;

Fig. 11 is a view of the vacuum controlled valve which is installed in the door jamb for insuring the supply of vacuum pressure to the pneumatic door lock while the door is closed;

Fig. 12 is a view similar to the view shown in Fig. 11 but illustrating the door moved to open position and the vacuum controlled valve moved to shut-off position to eliminate the supply of vacuum pressure to the pneumatic lock installed in the door;

Fig. 13 is a vertical transverse sectional view taken on line 13—13 of Fig. 12;

Fig. 14 is a vertical transverse sectional view taken on line 14—14 of Fig. 12; and Fig. 15 is a vertical sectional view taken on line 15—15 of Fig. 11.

My invention is directed to a pneumatic locking system for doors and the like wherein the operation of a multiplicity of locks may be controlled from a remote position. In vehicles, for example, it is often necessary to quickly secure the vehicle when the car is parked and often at least one of the conventional door locks may be left unlocked for the incidental possible loss of the vehicle by theft. Moreover, while travelling, especially with small active children, it is often desirable that at least the rear doors of the sedan type of vehicle be secured to prevent accidental opening of the doors with the accompanying danger of injuries by accidental falls from the vehicle. My invention provides a simple relatively inexpensive means of pneumatically controlling the locking of vehicle doors either simultaneously or selectively including means for unlocking at least one of the vehicle doors from the exterior thereof. The system of my invention contemplates operation of the pneumatic lock system either while the engine, from which the suction pressure for the vacuum lock system of my invention is obtained, is running or is at rest. I provide a vacuum tank which is evacuated during the suction cycle of the engine and from which vacuum pressure is made effective upon the several door locks. I provide means for preventing loss of vacuum during the remainder of the operating cycle of the engine so that the established vacuum pressure is efficiently utilized at all times whether the engine is running or is at rest. My invention also provides means for cutting off the supply of vacuum pressure to the vacuum controlled locks in the vehicle doors when the vehicle doors are open and during which time no vacuum pressure is required.

Although I have selected a motor vehicle as an example for the purpose of illustrating one application of my invention the system of my invention may be applied to pneumatic locks generally wherever a multiplicity of locks in any system such as a large building must be simultaneously secured. The system of my invention has been developed to eliminate the labor resulting from situations where in even moderate size building properties, as many as, for example, eighty seven or more conventional locks must be individually inspected at the close of each day and checked. With the system of my invention such multiplicity of locks can be simultaneously secured by pneumatic control from a remote position and save much of such labor of inspection and checking.

Referring to the drawings in more detail reference character 1 designates the chassis of a conventional automobile including driving engine 2 generally located near the front of the chassis. The driving engine 2 includes intake manifold 3 shown more clearly in Fig. 2 and the vacuum check valve device 4 connected between the intake manifold 3 and the vacuum tank 5 through pipe 6. The vacuum tank 5 is evacuated with each suction cycle of engine 2 and in order to maintain the vacuum pressure in vacuum tank 5 the vacuum check valve 4 is provided, consisting of cylinder 7 in which there is located a flexible diaphragm 8 which is sucked forward with each suction cycle of engine 2 moving the rod 9 and the cylindrical valve sleeve 10 connected therewith within the cylindrical sleeve 11. The valve sleeve 10 is provided with a port 10a while cylindrical sleeve 11 is provided with a port 11a. Under idling condition the slotted wall portion of valve sleeve 10 blocks the port 11a by reason of the pull exerted by the resilient biasing spring 12 anchored on the spider 14 supported in the interior of pipe 6 and connected with the end of rod 9 which is suitably connected with the valve sleeve 10 through spider 15. When, however, a suction cycle of the engine occurs, diaphragm 8 is sucked inwardly registering port 10a with port 11a, thereby effectively connecting the by-pass pipe 16 with the intake manifold 3 of the engine as shown. Under these conditions vacuum pulsing forces are exerted on vacuum tank 5, thereby increasing the vacuum therein which is prevented from vacuum leakage by the instantaneous closing of port 11a by movement of the valve sleeve 10 under operation of spring 12 to the position shown in Fig. 2 where the tank is cut off from the intake manifold 3 during all engine cycles other than the suction cyle.

The vacuum tank 5 is connected through pipe 17 to a control manifold 18 through a valve 19. The control manifold 18 and the valve 19 are mounted in a position convenient to the driver's position of the vehicle, the valve 19 being readily accessible for operation from the driver's position. There are five pipe connections leading from the control manifold 18 in the case of a four-door sedan automobile installation which I have indicated at 21, 22, 23, 24 and 25. The pipe connections 21—24 are provided for individually controlling the locks on the four doors of the sedan. The pipe connection 25 is provided for controlling one of the locks on one of the doors from an external position to the car.

The individual pipe connections 21—24 each include valves 26, 27, 28, and 29 respectively located conveniently to the driver's position and readily manipulatable selectively by the driver. The continuation of the pipes 21—24 are represented at 21a, 22a, 23a, and 24a leading to the pneumatically controlled locks for each of the four doors of the sedan. The locks are all uniform in construction and in describing one of the locks it will be understood that the same description applies for all of the locks. As represented, for example, in Figs. 11–15 the pipe 24a extending from valve 29 leads to the valve installation in the door frame of the chassis represented at 30. The pipe 24a terminates in the annular chamber 31 formed by the cylindrical central wall portion 32 and the frusto-conical wall portion 33 closed by outside walls fitting within the door frame 30 forming the chamber 31. The frusto-conical wall portion 33 is ported as represented at 33a and these ports are either closed or opened depending upon the position of the conical-shaped valve 34. In Fig. 11 the valve 34 is shown in open position with the door 35 of the vehicle closed whereas in Fig. 12 the valve 34 is shown in closed position with the door of the vehicle 35 open. The position of valve 34 is controlled by the valve rod 36 which carries valve 34. The valve rod 36 is reciprocable through the cylindrical guide 37 which connects with the cylinder 38 supported within the door frame 30. The cylinder 38 includes a sleeve 39 which serves as a guide for the interior end of valve rod 36 which is slidable therein under control of the flange 40 which is spring-biased, the coil spring 41 normally urging the valve rod 36 to the ejected position shown in Fig. 12 but allowing valve rod 36 to be depressed inwardly as shown in Fig. 11. The manipulation of valve rod 36 is controlled by a pin 42 carried by the spider 43 supported in the cylinder 44 opening into the hinged end of the door 35. The door 35 is shown hinged at 45 with the two leaves of the hinge represented at 45a and 45b, the leaf 45a being connected to the side of the door frame 30, whereas the leaf 45b is connected to the side of the door 35. The cylindrical wall portion 32 of annular chamber 31 opens through the leaf 45a of the hinge and is surrounded by a resilient gasket 46. The spider 43 with its associated pin 42 is centered with respect to leaf 45b of the hinge and is surrounded by the resilient gasket 47 so that when the door 35 is closed the resilient gaskets 46 and 47 are in mutual surface abutment and form a sealed joint preventing leakage of vacuum pressure which is conducted through pipe 24a, annular chamber 31, port 33a through the surface between the frusto-conical wall portion 33 and the conical-shaped valve 34 through the cylindrical wall portion 32 and through the open spider 43 to cylinder 44. From the cylinder 44 the vacuum pressure is conducted through pipe 48 which extends through the door 35 to the pneumatic lock actuating cylinder represented at 49. The pneumatic lock actuating cylinder is supported on the inner end of the lock frame 50 shown more particularly in Figs. 5–10.

The lock frame 50 is apertured at its outer end as represented at 51 for the passage of the slidable bolt 52 which is ejectable through the aperture 51 and the registering aperture 53 in the end wall of the car door 35 and the slotted recess 54 in the quarter panel or opposite door frame portion indicated at 55. The reciprocal movement of the bolt 52 from the unlocked position illustrated in Fig. 5 where bolt 52 is retracted from engagement with the slotted recess 54 in the door frame 55 to the locked position where bolt 52 extends through the slotted recess 54 is controlled by a balanced arrangement of spring tensioned cable operated over a pair of spaced pulleys shown more clearly in Figs. 5 and 6.

Lock frame 50 carries a pair of guide pulleys represented at 56 and 57 journaled on horizontal axes adjacent the inner corners of the lock frame and adjacent the end wall of the lock frame which is apertured at 51. The bolt 52 is guided in its horizontal movement by a slot 58 formed in the partition 59 in the lock frame and is restricted in its movement by the abutment of projections 60 carried by opposite edges of the bolt 52 with the partition 59. That is to say, bolt 52 is reciprocal through the lock frame between limitations sufficient to eject the bolt 52 through the registering apertures 51, 53, and 54 or to retract bolt 52 from the slotted recess 54 to enable door 35 to swing clear of door frame 55. This movement is controlled by the flexible cable 61, the inner ends of which are anchored at 62 and 63 to opposite edges of bolt 52 at a position intermediate the projections 60 and the projectable end of the bolt 52. The cable 61 extends around guide pulley 56 and through the aperture 64 in partition 59 and is looped through the apertured end of the projecting member 65 which connects the diaphragm 66 in the pneumatic lock actuating cylinder 49. Cable 61 after being looped through the apertured projecting member 65 passes through another slotted portion 64a in partition 59 and is looped around pulley 57 and connected to the anchor 63 as shown. To facilitate the assembly and maintenance of the controlling parts of the lock, pulleys 56 and 57 are journaled from opposite sides of the lock frame 50 as shown more clearly in Fig. 9. The two ends of the flexible cable 61 which are anchored at 62 and 63 are subjected to continuous tension by means of tension coil springs 67 and 68 extending between the anchors 62 and 63 on opposite edges of the slidable bolt 52 to anchors 69 and 70 on partition 59.

As heretofore observed, the pneumatic door locks which are installed on the doors are similar in detail to those heretofore described. That is, in the case of a four-door sedan the doors 71, 72 and 73 are hinged as explained with respect to door 35 and the distributing pipes 21a, 22a, and 23a connected to the penumatic lock actuating cylinder 74, 75 and 76 therein, in a manner similar to that described in connection with door 35. By opening valve 19 vacuum pressure is supplied through manifold 18. Valve 19 may be maintained open for certain conditions of operation of the lock system and then the operation of the doors individually controlled by selective operation of valves 26, 27, 28, and 29. That is by operating anyone of the valves 26, 27, 28, and 29 vacuum pressure is supplied to any one of the pneumatic lock actuating cylinders and the locking bolt withdrawn to free the door so that it may be opened by turning the conventional door latch. This will be understood more clearly by reference to Figs. 3 and 4 which illustrate the internal section of a typical valve such as 29, for example. The valve 29 includes a casing 77 to which the vacuum pressure inlet pipe 24 connects and from which the vacuum pressure distributing pipe 24a extends. The valve casing 77 includes a port 77a leading to atmosphere. The rotatable body structure of the valve shown at 29 includes a diametrically extending port 78 and a Y-connected port 79. The Y-connected port 79 is so angularly related to the axis of port 78 that in the position illustrated in Fig. 3 vacuum pressure from vacuum tank 5 is cut off from the annular chamber 31 of the pneumatic lock system, door 35 being bled to atmosphere. In this position the diaphragm 66 of the pneumatic lock actuating cylinder is wholly released and the associated door is free to be opened or closed because the tension coil springs 67 and 68 have moved the bolt 52 to the wholly retracted position illustrated in Fig. 5. When, however, the valve 29 is moved to the position illustrated in Fig. 4 the diametrically extending port 78 connects the vacuum pressure pipe 24 to the vacuum pressure distributing pipe 24a and closes the port 77a to atmosphere by movement of the Y-connected port to a position where it is closed by the wall of casing 77. Under these conditions vacuum pressure is supplied through diametrically extending port 78 through the annular chamber 31 and to the pneumatic lock actuating cylinder 49 sucking in the diaphragm 66 to a displaced position which tensions the cable 61 and causes the ejection of bolt 52 to the position shown in Fig. 6 where bolt 52 passes through the registering apertures 51 and 53 and into slotted recess 54, thereby locking the door pneumatically. This same action is individiually applicable to each of the doors. Simultaneous operation of all the doors is obtainable by moving valves 26, 27, 28 and 29 to the position illustrated in Fig. 4 and then operating valve 19 which is identical to the valve structure illustrated in Figs. 3 and 4. Valve 19 permits all of the annular chambers in the pneumatic lock actuating systems to be bled to atmosphere or subjected to vacuum pressure resulting in the locking or unlocking of all of the doors simultaneously. The valves are protected against movement to any position where the vacuum tank 5 could ever be bled to atmosphere.

In order to provide for the condition where the vehicle is left intentionally locked and where it is desired to re-enter the vehicle, I make provision on one of the doors as represented in Fig. 1 where the pneumatic lock system for that particular door may be actuated from an exterior position. This is accomplished by extending distributor pipe 25 from manifold 18 to a position outside the vehicle and to a control valve 80 which is connected through distributor pipe 25a to the annular chamber which corresponds to the annular chamber 31 heretofore explained and which for purposes of this description I have designated at 31'. The annular chamber 31' is thus in effect connected to the manifold 18 through two valves 26 and 80 in parallel, the valve 26 being located interiorly of the vehicle and actuatable from a position interior of the vehicle while the valve 80 is located exteriorly of the vehicle and operated exteriorly of the vehicle. Therefore the vacuum pressure exerted from the pneumatic lock actuating cylinder 74 in door 71 may be controlled either by valve 26 or by valve 80 enabling the bolt 52 to be retracted by an operation performed either interiorly or exteriorly of the vehicle.

By arranging the annular chamber 31 in each of the door frames the distribution of pneumatic pressure is terminated or arrested at each of the door positions when the doors are opened. Thus considerable saving in vacuum pressure is effected as during the times that the doors are open there is never any occasion for the bolts 52 to be ejected.

I have found the pneumatic lock system of my invention highly practical and safe in its operation and while I have described my invention in certain of its preferred embodiments, I realize that modifications of my invention may be made and I desire that it be understood that no limitations upon my invention are intended other than may be imposed by the scope of the appended claims.

What I claim as new and desire to secure by Letters Patent of the United States is as follows:

1. A pneumatic lock system for vehicles comprising in combination with a vacuum tank reservoir having a vacuum intake, a vacuum pressure line extending between said reservoir and a position adjacent a door frame, a door swingably mounted in said door frame, a pneumatic ejection lock carried by said door and co-acting with a latch in said door frame and means for conducting vacuum pressure to said pneumatic lock through said door frame and said door while the door is in closed position and means for interrupting the operation of the aforesaid means when said door is open.

2. A pneumatic lock system for vehicles comprising in combination with a door frame a door hingedly mounted for swinging movement in said frame, a vacuum pressure feed mounted in said door frame adjacent the hinged mounting of said door, a vacuum pressure feed tube mounted in said door and alignable with said vacuum pressure feed in said door frame, a pneumatic lock mounted in said door and including a latching bolt movable into and out of latching position with respect to an aligned recess in said door frame, said vacuum pressure feed tube and said vacuum pressure feed conveying vacuum pressure from a vacuum pressure means to said pneumatic lock for controlling the operation of said latching bolt and means for maintaining vacuum pressure in said vacuum pressure feed in said door frame.

3. A pneumatic lock system for vehicles as set forth in claim 2 in which there are sealing means associated with both said vacuum pressure feed and said vacuum pressure feed tube, said sealing means establishing abutting relationship with each other when the door is closed with respect to said frame for insuring the delivery of vacuum pressure to said pneumatic lock.

4. A pneumatic lock system for vehicles as set forth in claim 2 in which said vacuum pressure feed in said door frame includes a cut off valve movable to either of two positions in one of which vacuum pressure is supplied to the pneumatic lock within said door while said door is closed and in the other of which the vacuum pressure is cut off from supply to the pneumatic lock in said door when said door is open.

5. A pneumatic lock system for vehicles as set forth in claim 1 in which the intake for said vacuum tank reservoir is connected with the manifold of an internal combustion engine during the suction cycles thereof, and means for interrupting said connection and closing the intake to said vacuum tank reservoir during all cycles of the engine other than the suction cycles thereof.

6. A pneumatic lock system for vehicles as set forth in claim 1 in which the intake for said vacuum tank reservoir is connected with the manifold of an internal combustion engine during the suction cycles thereof, and means for interrupting said connection and closing the intake to said vacuum tank reservoir during all cycles of the engine other than the suction cycles thereof, said means comprising a diaphragm subjected to impulses during the suction cycles thereof, a valve rod connected with said diaphragm, a cylindrical body carried by said valve rod and ported at one side thereof, said cylindrical body being reciprocative within a cylindrical sleeve ported at one side thereof, a bypass connection leading from said ported cylindrical sleeve to said manifold, spring means for normally biasing said cylindrical body to a position within said cylindrical sleeve where the port therein is offset from alignment with the port in said cylindrical sleeve for all cycles of operation of said engine other than the suction cycles thereof, said diaphragm operating to move said cylindrical body against the action of said spring to a position within said cylindrical sleeve where both of the ports therein are aligned for providing a suction passage from said manifold through said bypass connection to said vacuum tank reservoir.

7. A pneumatic lock system for vehicles as set forth in claim 1 in which the means for conducting vacuum pressure to said pneumatic lock includes two coacting series connected vacuum pressure paths, one of said pressure paths extending inside said frame and the other of said pressure paths extending outside of said frame, and a separate control valve disposed in each of said paths, one of said control valve being operative from a position interiorly of said frame and the other of said control valves being operative from a position exteriorly of said frame.

8. A pneumatic lock system comprising in combination with a vacuum pressure tank, a multiplicity of doors independently operative in associated door frames, a pneumatically controlled ejection latch individual to each of said doors and projectable into and retractible from an associated recess in the adjacent door frame, a control manifold, a connection from said control manifold to said vacuum tank, a valve located in said connection and movable to either of two positions for conducting vacuum pressure from said vacuum tank to said control manifold or for bleeding said control manifold to atmosphere, a separate vacuum pressure distributing pipe extending from said control manifold to each of said pneumatically controlled ejection latches, a valve disposed in each of said vacuum pressure distributing pipes and operative to either of two positions, one of which conveys vacuum pressure to the associated pneumatically controlled ejection latch and in the other of which the said pneumatically controlled ejection latch is bled to atmosphere and an additional vacuum pressure distributing pipe which leads from said manifold to a position exteriorly to one of said doors and connected to one of said pneumatically controlled ejection latches, and a valve disposed in said last mentioned vacuum pressure distributing pipe and operative from a position exterior to said door.

9. A pneumatically controlled ejection lock comprising a frame structure apertured at one end thereof, a latching bar slidably mounted in said frame structure for movement through the aperture in one end of said frame structure, abutment stops on said latching bar adapted to establish abutting relation with said frame structure for restricting the movement of said latching bar in one direction, spring means normally biasing said latching bar in a retracted position within said frame structure, restricted by the abutment of said abutment stops with said frame structure, a vacuum pressure actuator carried by said frame structure and a flexible cable extending between said vacuum pressure actuator and said latching bar for moving said latching bar against the action of said spring means to an ejected position, said frame structure including a pair of pulley members journaled in the interior corners of said frame structure adjacent the apertured end of said frame and wherein said flexible cable extends from said vacuum pressure actuator around said pulley members to anchored positions on said latching bar whereby said latching bar is moved in dynamically balanced relation to said frame structure under control of said vacuum pressure actuator to an ejected position and under control of said spring means in a retracted position.

10. A pneumatically controlled ejection lock comprising a frame structure apertured at one end thereof, a latching bar slidably mounted in said frame structure for movement through the aperture in one end of said frame structure, abutment stops on said latching bar adapted to establish abutting relation with said frame structure for restricting the movement of said latching bar in one direction, spring means normally biasing said latching bar in a retracted position within said frame structure, restricted by the abutment of said abutment stops with said frame structure, a vacuum pressure actuator carried by said frame structure and a flexible cable extending between said vacuum pressure actuator and said latching bar for moving said latching bar against the action of said spring means to an ejected position, and in which said vacuum pressure actuator carried by said frame structure includes a vacuum chamber subjected to vacuum pressure, a diaphragm in said chamber, a link member extending from said diaphragm and a connection between said link member and said flexible cable whereby displacement of said diaphragm under control of vacuum pressure effects an ejection of said latching bar, while release of vacuum pressure against said diaphragm effects a retraction of said latching bar under control of said spring means.

11. A pneumatically controlled ejection lock comprising a frame structure apertured at one end thereof, a latching bar slidably mounted in said frame structure for movement through the aperture in one end of said frame structure, abutment stops on said latching bar adapted to establish abutting relation with said frame structure for restricting the movement of said latching bar in one direction, spring means normally biasing said latching bar in a retracted position within said frame structure, restricted by the abutment of said abutment stops with said frame structure, a vacuum pressure actuator carried by said frame structure and a flexible cable extending between said vacuum pressure actuator and said latching bar for moving said latching bar against the action of said spring means to an ejected position, and in which said frame structure includes a pair of pulley members journaled in the interior corners of said frame structure adjacent the apertured end of said frame and wherein said flexible cable extends from said vacuum pressure actuator around said pulley members to anchored positions on said latching bar whereby said latching bar is moved in dynamically balanced relation to said frame structure under control of said vacuum pressure actuator to an ejected position and under control of said spring means in a retracted position, one of said pulley members being journaled from one side of said frame structure and the other of said pulley members being journaled from the opposite side of said frame structure for facilitating the threading of said flexible cable around said pulley members.

References Cited in the file of this patent

UNITED STATES PATENTS

| | | |
|---|---|---|
| 1,403,290 | Catching | Jan. 10, 1922 |
| 1,532,907 | Long | Apr. 7, 1925 |
| 1,555,174 | Williams | Sept. 29, 1925 |
| 1,797,977 | Folberth et al. | Mar. 24, 1931 |
| 2,530,628 | Pivero | Nov. 21, 1950 |

FOREIGN PATENTS

| | | |
|---|---|---|
| 141,980 | Great Britain | Apr. 29, 1920 |